United States Patent
Pignataro et al.

(10) Patent No.: US 12,381,782 B2
(45) Date of Patent: Aug. 5, 2025

(54) IN-BAND SUSTAINABLE PACKET MANAGEMENT

(71) Applicant: Cisco Technology, Inc., San Jose, CA (US)

(72) Inventors: Carlos Pignataro, Cary, NC (US); Eric A. Voit, Bethesda, MD (US); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/360,353

(22) Filed: Jul. 27, 2023

(65) Prior Publication Data

US 2025/0039047 A1   Jan. 30, 2025

(51) Int. Cl.
  *H04L 41/0833*   (2022.01)
(52) U.S. Cl.
  CPC ................. *H04L 41/0833* (2013.01)
(58) Field of Classification Search
  CPC ....... H04L 43/08; H04L 43/10; H04L 45/123; H04L 12/12; H04L 41/0833; H04L 45/122
  See application file for complete search history.

(56) References Cited

U.S. PATENT DOCUMENTS

| | | | | |
|---|---|---|---|---|
| 9,819,583 B2* | 11/2017 | Dharmadhikari | ....... | H04L 43/08 |
| 11,863,388 B1* | 1/2024 | Pignataro | ............. | H04W 40/10 |
| 2005/0089054 A1* | 4/2005 | Ciancaglini | ......... | H04L 49/3027 |
| | | | | 370/412 |
| 2013/0031244 A1 | 1/2013 | Zhang et al. | | |
| 2014/0258498 A1 | 9/2014 | Banerjee et al. | | |
| 2016/0112502 A1* | 4/2016 | Clarke | .................. | G06F 9/5044 |
| | | | | 709/201 |
| 2018/0343177 A1 | 11/2018 | Fazlyab et al. | | |
| 2019/0182103 A1 | 6/2019 | Pignataro et al. | | |
| 2020/0084522 A1* | 3/2020 | Mirsky | ............... | H04L 41/0246 |
| 2023/0029987 A1* | 2/2023 | Gandhi | .................... | H04L 45/70 |
| 2023/0095746 A1* | 3/2023 | Estabrooks | ............. | H04L 43/08 |
| | | | | 370/410 |

\* cited by examiner

*Primary Examiner* — Abdullahi E Salad

(74) *Attorney, Agent, or Firm* — Rutan & Tucker, LLP; Ravi Mohan

(57) ABSTRACT

Devices and methods that incorporate sustainability data within a header of a data packet to allow for the generation of sustainable configurations for various network devices are disclosed. Power efficiency is obtained at a node-level by including metadata to existing network flows, in an in-band/in-situ configuration. This information may be used for optimum flow placement. Received data packets may be formatted with sustainability data within a metadata shim. The received data packets are processed, and a sustainable configuration is generated for the one or more network devices. The generated sustainable configuration is transmitted to the one or more network devices to enable efficient and effective management of network devices by incorporating sustainability data into the data packets.

20 Claims, 10 Drawing Sheets

IN-BAND SUSTAINABLE PACKET MANAGEMENT

The present disclosure relates to networking. More particularly, the present disclosure relates to incorporating sustainability data within a header of a data packet to allow for the generation of sustainable configurations for various network devices.

BACKGROUND

Traditional network monitoring approaches, like SNMP (Simple Network Management Protocol) or flow-based monitoring, typically lack detailed visibility into individual packets throughout a network. As a result, they may not capture granular insights into the behavior, performance, or potential issues associated with each individual packet as it traverses the network. This limitation can hinder precise troubleshooting, precise analysis of network performance, and the ability to identify packet-level anomalies or bottlenecks.

In contrast, In-situ (or In-Band) Operations, Administration, and Maintenance ("iOAM") enables real-time analysis of network performance, troubleshooting, and optimization without the requirement of dedicated monitoring devices or additional overhead. One of the advantages of iOAM is its ability to capture and log specific data points at various network hops, including timestamps, path information, and performance metrics. This detailed information can be invaluable for network troubleshooting and performance optimization, as it allows network operators to identify and diagnose issues more effectively. Furthermore, iOAM can be used for advanced network analytics, such as to determine latency bottlenecks, identifying packet loss patterns, or analyzing traffic behavior.

However, when evaluating data transmission across networks, iOAM lacks, for example, information and context regarding the cost and energy source associated with devices involved in transferring the data. Without this context, it becomes challenging to make informed determinations regarding a most appropriate pathway, without at least considering factors such as energy production sources and environmentally friendly routes. Indeed, the absence of comprehensive information regarding the cost and energy impact of network devices makes it challenging to prioritize energy-efficient options, let alone identify sustainable or optimal "green" pathways for data transfer.

SUMMARY OF THE DISCLOSURE

Systems and methods for incorporating sustainability data within a header of a data packet to allow for the generation of sustainable configurations for various network devices in accordance with embodiments of the disclosure are described herein. In some embodiments, a method of sustainably managing network devices includes receiving a plurality of data packets from one or more network devices, wherein the plurality of data packets is formatted with sustainability data within a metadata shim, processing the received data packets, generating a sustainable configuration for the one or more network devices, and transmitting the generated sustainable configuration to the one or more network devices.

In some embodiments, the sustainability data includes node-level sustainability data.

In some embodiments, the method is further configured to generate a heatmap of the one or more network devices based on the sustainability data.

In some embodiments, the sustainable configuration is configured to better optimize a next hop in the network.

In some embodiments, the method is executed via a non-centralized series of network devices.

In some embodiments, the sustainability data is configured to provide verification of power usage within one or more downstream network devices.

In some embodiments, a network device includes a processor, at least one network interface controller configured to provide access to a network, and a memory communicatively coupled to the processor, wherein the memory includes an in-band sustainable data packet logic. The logic is configured to gather sustainability data, generate a data packet for transmission to another network device on the network, wherein the data packet includes a header, incorporate the sustainability data within the header, and transmit the data packet to at least another network device on the network.

In some embodiments, the incorporation is within a metadata shim.

In some embodiments, the incorporation occurs on every generated data packet.

In some embodiments, the incorporation occurs periodically.

In some embodiments, the incorporation occurs in response to one or more triggering events.

In some embodiments, the sustainability data is associated with one or more nodes.

In some embodiments, the sustainability data is only associated with network nodes.

In some embodiments, the sustainability data is normalized.

In some embodiments, the data packet is formatted as an in-situ operations, administration, and maintenance (iOAM) data packet.

In some embodiments, a network device, includes a processor, at least one network interface controller configured to provide access to a network, and a memory communicatively coupled to the processor, wherein the memory includes an in-band sustainable data packet logic. The logic is configured to receive a plurality of data packets from another network device on the network wherein the plurality of data packets are each formatted with sustainability data within a metadata shim, process the received plurality of packets, parse the sustainability data from within the metadata shims of a plurality of data packet headers, generate a sustainable configuration for one or more network devices based on at least the parsed sustainability data, and transmit the generated sustainable configuration to the one or more network devices.

In some embodiments, the sustainable configuration includes one or more node settings.

In some embodiments, the one or more node settings include entering a lower-power mode.

In some embodiments, the one or more node settings include enabling a power-saving feature.

In some embodiments, the one or more node settings include disabling a power-hungry feature.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
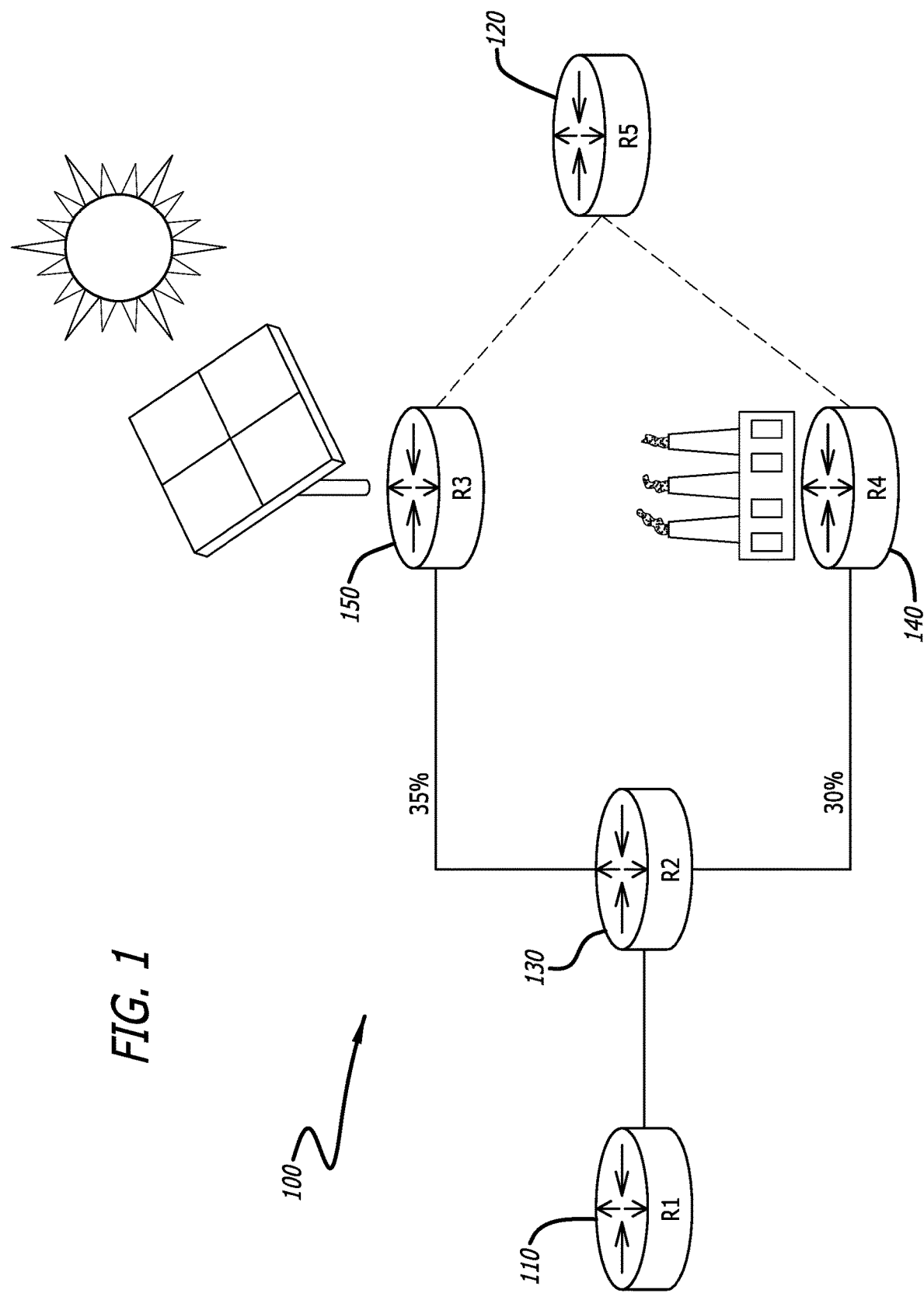
FIG. 1 is a schematic diagram of a network with network devices powered by various power source types in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods that incorporate sustainability data within a header of a data packet to allow for the generation of sustainable configurations for various network devices in accordance with embodiments of the disclosure are described herein.

Various embodiments described herein extend one or more headers within the iOAM framework to insert and carry at least power and other efficiency details gathered during operations of a network. For example, it is envisioned that efficiency for any single hop within a network can undergo dynamic changes depending on various factors, including a current utilization of the device being traversed, which can fluctuate over different periods of time, without limitation. Accordingly, in some embodiments, power efficiency at a node-level is obtained by including metadata to existing network flows, in an in-band/in-situ configuration. This information may be used for optimum flow placement across a plurality of use-cases.

In some embodiments, an iOAM header is extended to insert and carry power efficiency and GHG details gathered during operations of a network. With respect to any single hop, this efficiency may experience some degree of dynamic change based on the current utilization of a transited device over some period of time, for example. However, in a networking device, a significant portion of energy is utilized to keep the device "on", and the location—and thus source of electricity—does not change. Various state variables may be generally defined at the node level. For example, power efficiency may correspond to power over overall throughout the network and may be expressed in kWatt/Gbps. Similarly, energy efficiency may correspond to energy used over a full day (24 hours) over the overall device throughout and may be expressed in kWatt*H/Gbps. A location may include one or more aspects of geo-location to determine a carbon intensity of the electricity used. In general, GHG may refer to an amount of $CO2e$ generated to produce the electricity used in the device over a day, throughout device at a particular time.

In some embodiments, an average per-packet energy consumed for a packet of a particular size over the last five minutes may be considered, for example. While analyzing the average per-packet energy consumed over the last five minutes provides a snapshot of recent performance, it may also be valuable to review energy consumption over longer periods, such as the last hour, day, or even week. It should be understood that examining energy consumption trends across these different time frames enables the identification of patterns, seasonal variations, or trends that may not be apparent within a shorter five-minute window, for example. Additionally, exploring metrics such as the cumulative energy consumed by packets of the same size over these extended time frames can reveal the overall energy impact and provide a more holistic view of energy efficiency. By considering multiple time frames, network administrators can gain valuable insights into the energy consumption patterns, optimize resource allocation, and make informed decisions to ensure sustainable and efficient data transmission.

This dynamic nature of efficiency opens several possibilities and considerations. For instance, during periods of low device utilization, alternative routing paths may be identified that can optimize efficiency and reduce congestion. Additionally, load balancing techniques can be employed to distribute traffic across multiple paths, ensuring that no single device becomes heavily burdened and maintaining overall network efficiency. Furthermore, network administrators can leverage real-time monitoring and analysis tools to dynamically adjust routing decisions and resource allocation, maximizing efficiency based on the changing utilization patterns of the transited devices.

In some embodiments, the extended iOAM framework can be configured as an analyzer to examine, aggregate and/or consolidate per-hop results from egress nodes within a network domain, without limitation. Furthermore, the analyzer can be used to further identify if the data flow within the network is being steered over energy efficient paths (normalized to equal bandwidth). In such embodiments, the extended iOAM framework may be responsible for collecting and analyzing data generated by each egress node as packets traverse the network. By capturing and processing the per-hop results, the extended iOAM framework gains valuable insights into the performance and behavior of the network at various stages. It can aggregate the results, combining data from multiple egress nodes, to provide a comprehensive view of the overall network performance. In some embodiments a comparison may be implemented. For example, consider a flow "F1" with respect to routers R1 - - - R2, and a flow "F2" with respect to routers, R1 - - - R3. It is envisioned that by obtaining the watts/gig over the two paths, F1 and F2's flow energy may be compared for a fixed amount of traffic.

This analysis can include metrics such as latency, packet loss, bandwidth utilization, or any other relevant performance indicators, without limitation. To that end, the per-hop results may be utilized to further identify if the data flow within the network is being steered over energy efficient paths. No changes in data flow are needed if energy-efficient paths are being utilized to reasonable utilization rates. However, when the controller determines that a more relevant/ energy efficient path mix is possible across the set of possible paths, forwarding tables at ingress or transit nodes can be modified accordingly. Moreover, when flows have migrated or shifted away from lightly used or underutilized paths, it becomes possible to de-power more energy-intensive links, line-cards, routers, and similar components.

Similarly, in some embodiments, a full mesh of flows on a network domain may be identified using in-situ/in-band OAM extensions to create a heat-map of energy efficiency. For example, the heatmap may visually represent varying levels of energy efficiency across different components or elements of the network. In some embodiments, the heatmap may be configured to assign colors or shades to different areas of the network based on their energy efficiency levels. Areas with higher energy efficiency are usually represented by cooler colors like blue or green, while areas with lower efficiency may be represented by warmer colors like yellow or red. Accordingly, it is envisioned that the heatmap provides an intuitive and quick overview of energy efficiency throughout the network, allowing users to identify specific areas that may require optimization or improvement to enhance overall energy efficiency and reduce energy consumption.

In some embodiments, a central controller may be configured to actively monitor expected energy efficiency of paths. Those skilled in the art will appreciate that the central controller preferably verifies and validates the actual utilization of flows as they traverse the network. By doing so, the central controller can maintain a real-time understanding of the network's traffic patterns, resource allocation, and overall performance. This verification process allows the controller to confirm that the intended paths are being followed correctly and that flows are not deviating or encountering any irregularities.

In instances where monitoring is performed at the egress, there is a possibility of dynamically adjusting the next-hop forwarding at upstream devices to optimize network performance. This may entail, for example, consideration of actions such as directing packets into a Segment Routing path. By monitoring the packet paths at the egress, insights regarding various traffic patterns, performance metrics, and potential bottlenecks may be better understood. Additionally, in some embodiments, dynamic tuning of next-hop forwarding may enable the implementation of advanced routing techniques, such as Segment Routing, which offers flexibility and scalability by allowing packets to be directed along specific paths based on predetermined policies or conditions.

In iOAM, "Trace Options" generally refer to configuration settings or parameters that control the behavior and characteristics of the iOAM trace data added to network packets using either a pre-allocated trace and/or an incremental trace. Thus, Trace Options generally define what specific information is collected and embedded in the packets as they traverse the network. Trace Options in iOAM allow network operators to customize the type and granularity of telemetry data they want to capture. These options include parameters such as hop-by-hop behavior, timestamping, packet header fields, path identification, and other performance metrics.

For example, in some embodiments, one or more Trace Options may be configured with a new iOAM Trace "type", such that the extended iOAM header includes by way of non-limiting example, at least power specific criteria such as an energy source type, energy cost for a frame of a particular size across a specific hop during a desired time interval, number of seconds of duration of the most-recent time period, a cumulative energy cost, one or more conditional rules, and/or CO2e equivalents given emissions factors. It should be understood that the forgoing list of power specific criteria is merely exemplary and that many other criteria may be included without exceeding the scope and spirit of the instant disclosure.

Collected data may be used for local analytics for policy adherence or to ensure that traffic flow is being steered over a desired energy-efficient path. Alternatively, the data can be used to highlight a holistic carbon footprint, a product-specific carbon footprint, and/or a lifecycle carbon assessment alone or in combination, and without limitation. For example, in some embodiments, the holistic carbon footprint may include a comprehensive assessment of various environmental impact and carbon emissions associated with the entire network infrastructure and its operations. It may correspond to various factors that contribute to carbon emissions throughout the network's lifecycle, including manufacturing, energy consumption, maintenance, and/or disposal. Moreover, the holistic carbon footprint analysis may consider both direct and indirect emissions associated with network components, such as servers, switches, routers, and data centers. Similarly, the product-specific analysis typically includes contextual information regarding carbon emissions generated throughout the lifecycle of a product, including by way of non-limiting example, the product type, manufacturer, usage, and/or end-of-life disposal. The lifecycle carbon assessment may include a comprehensive analysis of the carbon emissions and environmental impact associated with the entire lifecycle of the network infrastructure. In some embodiments, this may include an assessing a carbon footprint at every stage, from the extraction of raw materials for network equipment manufacturing to its eventual disposal or recycling.

In various embodiments, the collective data from the transit devices may be utilized to identify if the flow is being steered over the energy efficiency path. If the answer to that inquiry is "yes", then no action is taken. If the answer to that inquiry is "no", the controller may be configured to compute a relevant and efficient path to modify the forwarding table accordingly.

It is contemplated that insertion of the iOAM header to collect the data can be continuous, while in another, it can be sampled (statistical, random, etc.) In a continuous mode, for example, all or substantially all traffic/packets may be inserted with the iOAM header to collect one or more various metrics from the transit devices. Similarly, in a random mode, the ingress can randomly set the iOAM header in different flows/packets. Furthermore, a trigger or threshold may be utilized to insert the iOAM header. For example, toggling a power source from solar to coal-based energy may be one trigger that initiates the insertion of iOAM for data collection and analytics. Additionally, or in the alternative, the time of day, user or location may be utilized as a trigger. Multiple triggers or thresholds may be implemented as well, without limitation. In the sampled mode, the ingress can statistically set the iOAM header in different packets in a flow, or different flows within ports or nodes.

In some embodiments, a TCP connection may be established for a large transfer or batch process. An application can send several SYN packets, varying the source TCP port to trigger different ECMP paths, collect energy efficiency when all the SYN+ACKs are received, and only ACK the preferred path on the basis of energy utilization, for example. It is envisioned that between two IP endpoints, several parallel iOAM headers may be appended to packets and flows on different paths (ECMPs) to obtain a Power-Aware Multi-Path ECMP-enabled Trace.

To ensure the integrity of energy-specific information before using it for analytics or other purposes, there are several options for signatures that can be employed. For example, in some embodiments, a signature may be placed across the information added at each specific hop, using canary hopping. Additionally, various other signature mechanisms, such as cryptographic signatures or digital certificates, can also be utilized to provide an extra layer of security and authentication, without limitation. In some embodiments, a transit device, upon injecting the energy-specific information in the iOAM header, may also append its own canary stamp or similar signature to sign other elements of the packet and the energy usage. The signed item may be used to ensure the integrity of the device while injecting the data. Consequently, devices accessing the iOAM info to evaluate the identity of the device asserting the consumed energy. Another advantage of employing such methods is that the energy information originates from a device with a verifiable identity and is in a demonstrably authentic and/or uncorrupted state.

In some embodiments, when a device is powered with PoE and if the link is used as upstream, the downstream power provided by the PoE device may be used to validate if the data injected by the downstream device is accurate. For example, when an access point ("AP") receives a packet from a downstream client/STA or from another AP within a mesh, it preferably includes its own power details as well, including the power source, power level, etc. When the upstream wireless LAN controller ("WLC") receives the packet, for example, it can be configured to inject the downstream power provided via PoE to the AP. In some embodiments, this can be done when the packet is received from a link over which PoE is provided, and if the incoming packet is injected with energy specific iOAM data. The collected data can be used to correlate and confirm if there is any discrepancy between the level reported by AP and the level provided by the WLC.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic diagram of a network 100 with network devices powered by various power source types in accordance with an embodiment of the disclosure is shown. The network 100 can include a plurality of devices, e.g., routers 110, 130, 140 and 150, which can be in communication with each other and/or a remote server, such as a cloud-based server 120. The network 100 depicted in FIG. 1 is shown as a simplified, conceptual network. Those skilled in the art will understand that a network 100 can include a large variety of devices and be arranged in a virtually limitless number of combinations based on the desired application and available deployment environment.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," power source," "power consumption," and "power plant" when describing energy delivery and utilization, even though those skilled in the art will recognize that those elements are delivering or processing energy (specifically electricity) at a certain rate of power. References to these terms are utilized herein specifically to increase the ease of reading.

Traditionally, devices operating within a network 100 have not considered various aspects of operation that can relate to the overall sustainability of the network. For example, devices in communication networks have often used grid-supplied energy as a primary power source. This grid-supplied energy can regularly provide energy that has been generated by a negative environmental impacts-heavy power source such as a coal-powered power plant. However, modem power grids often have more diverse and cleaner energy sources for the provided generated energy. Some devices can still be powered by power sources that utilize fossil fuels, such as the router R4 140 as depicted in FIG. 1. Alternatively, some devices can operate by using renewable sources of energy, such as the router R3 150 which is conceptually depicted as being powered by solar power.

Those skilled in the art will recognize that the generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impact measurements can be measured with specific units to quantify these changes. Various aspects of energy use can be associated with one or more of these negative environmental impacts and classified as one or more sustainability-related attributes.

In the embodiment depicted in FIG. 1, the operation of a coal-powered power plant will create a sizeable amount of negative environmental impacts in the form of carbon emissions and the like. Contrast that with a solar array which may not create emissions when generating electricity, but may negative environmental impacts, such as carbon emission generation, associated with the production and/or disposal of the solar array. Various methods of measuring these negative environmental impacts may occur. One measurement may be to examine the waste products created by the power generated (such as nuclear waste, vs. solar array e-waste, etc.).

Another measurement of negative environmental impacts that can be utilized when comparing power sources is to determine the amount of greenhouse or carbon emissions released per unit of electricity generated. Specifically, various embodiments described herein may utilize the $CO_2e$ kg/kWh metric which measure the amount of kilowatt hours produced per kilogram of carbon dioxide gases released into the environment. Therefore, when discussing a negative environmental impacts-heavy power source compared to a clean(er) power source, the clean power source can, for example, have a better $CO_2e$ kg/kWh rating compared to the negative environmental impacts-heavy power source. Utilizing a cleaner power source thus provides for a more sustainable network operation.

In order the maximize the overall sustainability of a network, it may be desirable to increase the use of cleaner power sources with a lower overall negative environmental impact as opposed to power sources with a higher overall negative environmental impact when operating the network. Thus, there can be a need to be aware of the source of energy provided at each device along the route of data travel. Additionally, other factors such as the attributes unique to each device can be factored in, along with the current and/or expected traffic, etc. Once known, an optimal method of traversing the data may need to be calculated. As discussed in more detail, this path algorithm can be utilized to better optimize the locations selected within a network for data travel.

Other methods may be utilized to increase sustainability in network operations. In many embodiments, the network devices themselves may have one or more features or other capabilities that can allow for a more efficient operation. For example, a network router may be operated in a lower power mode or be powered off entirely for a specific period of time or until an event occurs. Additional embodiments may utilize various other power-saving capabilities that can be turned on or off remotely or in response to an event or predetermined threshold being exceeded. Often, operations performed by the network devices can be utilized in scenarios where network performance will not be affected or is affected such that no loss in user experience occurs. By utilizing less power during operation, a higher level of sustainability can be achieved.

Together, the type of power source providing electricity to a network device, along with the various sustainability-related capabilities of the router can be understood as the sustainability-related attributes of that network device. During operation, one or more devices within the network may seek and collect the sustainability-related attributes of various network devices, which can provide insight into both the type of power source providing power to the device, but also the various capabilities of the network device that may be activated to provide more efficient operation.

Additionally, when generating various scores, metrics, or other evaluations of the network devices within a network 100, the sustainability-related attributes can vary based on a variety of factors such as the time of day, current network traffic, expected network traffic, and historical usage patterns. For example, a network router may receive energy from a solar power source during the day but receives energy from a coal-powered power plant at night. In these instances, an averaged score may be used, or a unique score may be generated at the time of operation. In another example, network traffic may be such that removing one or more network devices from the optimal sustainable data paths may negatively affect user experiences, such as when a sporting event occurs. As such, scores may be generated at numerous times depending on the desired application. Often, the act of measurement may negatively affect sustainability such that determining the proper amount of measurements for a given outcome may be determined.

Although a specific embodiment for a network 100 is described above with respect to FIG. 1, any of a variety of systems and/or processes may be utilized in accordance with embodiments of the disclosure. For example, the network could be broken into a plurality of partitions, wherein each partition could have specific needs, service level agreements, etc. that can alter sustainability-optimization. The elements depicted in FIG. 1 may also be interchangeable with other elements of FIGS. 2-8 as required to realize a particularly desired embodiment. Augmented protocols to carry out these described processes are described below.

Although a specific embodiment for a conceptual illustration of extending the iOAM framework to insert and carry at least power and other efficiency details gathered during operations of a network suitable for carrying out the various steps, processes, methods, and operations described herein is discussed with respect to FIG. 1, any of a variety of systems and/or processes may be utilized in accordance with embodiments of the disclosure. For example, the device, controller, or logic may be a specialized device within the network or operated by a network administrator remotely from the deployed environment. In certain embodiments, the device, controller, or logic may be a logic that is operated or distributed through the access points of the network, or via a central controller, without limitation. The elements depicted in FIG. 1 may also be interchangeable with other elements of FIGS. 2-10 as required to realize a particularly desired embodiment.

Figure 2:
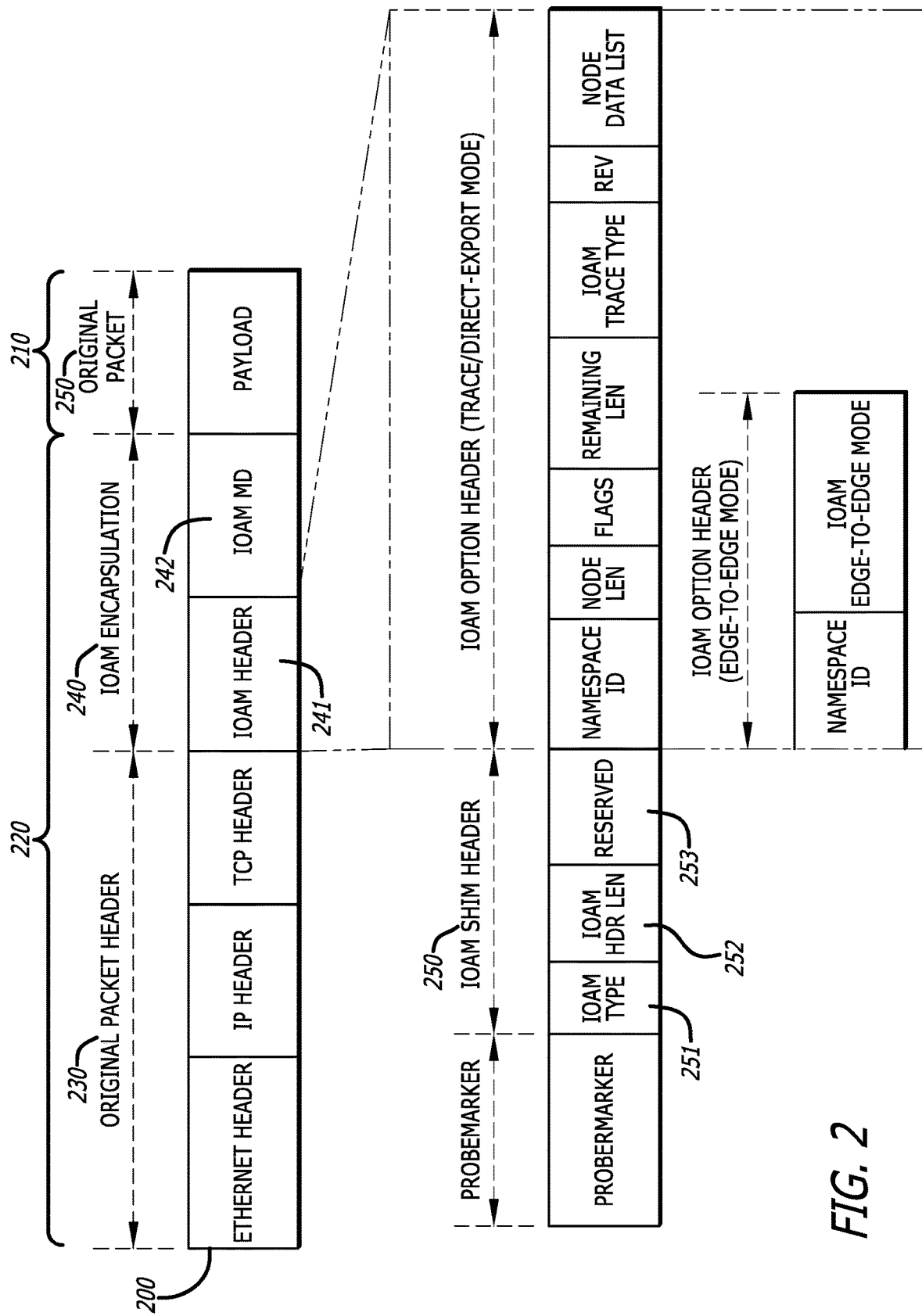
FIG. 2 is a conceptual illustration of a data packet configured as an in-band operations, administration, and maintenance packet in accordance with various embodiments of the disclosure.

Referring to FIG. 2, a conceptual illustration of a data packet configured as an in-band operations, administration, and maintenance packet in accordance with various embodiments of the disclosure is shown. As shown, an exemplary data packet 200 comprises a payload 210 and header 220 which comprises an original packet header 230 and an iOAM encapsulation 240. As shown the data packet 200 is a sampled TCP packet after iOAM encapsulation, and as such, it is shown as including an ethernet, header, IP header, and TCP header. It should be appreciated, however, that any other data packet such as VXLAN packets may be utilized without limitation, and as such, not every implementation will require TCP or VXLAN aspects, for example.

The iOAM header 241 is added during iOAM encapsulation 240. It facilitates in-band OAM operations and contains specific fields required for iOAM processing. These fields can include information such as the type of iOAM data, flags for controlling iOAM behavior, and data fields for storing measurement or diagnostic information. Similarly, iOAM Metadata 242 is a component within iOAM encapsulation 240 that allows for collecting and analyzing network telemetry and performance data. It captures data related to the packet's journey through the network, such as timestamps, hop-by-hop information, and other metadata. The iOAM Metadata 242 is added to the packet during iOAM encapsulation 240. The payload 210 carries the actual data being transmitted. It may include application data that the sender wants to send to the receiver. The payload could be any type of data, such as a file, a web page, or a message. The payload is part of the original packet and remains unchanged during iOAM encapsulation 240.

An iOAM header 241 includes an iOAM SHIM header 250, and an optional iOAM option header. In some embodiments, the 32-bit iOAM SHIM header 250 identifies the data collection mode of iOAM packets. The iOAM option header format varies according to the data collection modes. The MD information of a collection node varies according to the data collection modes. As shown in the following figure, the MD information of a collection node may include information regarding inbound and outbound interfaces, forwarding delay, timestamp, and queue depth of the node in trace and direct-export modes, and the sequence number and the timestamp when a packet enters the device in edge-to-edge mode. In some embodiments, the iOAM SHIM header 250 may include by way of non-limiting example, at least different types of contextual data, such as an energy source type and/or location, energy cost for a frame of a particular size across a specific hop or a next hop during a desired time interval, number of seconds of duration of the most-recent time period, a cumulative energy cost, one or more conditional rules, and/or CO2e equivalents given emissions factors.

The iOAM Type field 251 indicates a specific type of iOAM being used. In some embodiments, the iOAM Type field 251 identifies an iOAM option type or function that is being employed. Different types of iOAM provide various functionalities for in-situ monitoring and troubleshooting of network paths. The iOAM Type field helps differentiate between these types. iOAM Hdr Len 252 generally specifies the length of the iOAM shim header 250 in bytes. In some embodiments, it may indicate a size of the iOAM shim header 250, excluding any iOAM data that follows. This length is useful for parsing the iOAM shim header 250 correctly and locating the subsequent iOAM data.

In general, the reserved field 253 in the iOAM shim header 250 includes a set of bits reserved for future use. For example, in some embodiments, the iOAM shim header 250 may be extended to include an iOAM trace type that includes a bit such as bit 12, that once set, indicates the presence of power efficiency and/or greenhouse gas ("GHG") in the node data. When "Bit 12" of the iOAM header is set, for example, a new "iOAM Node Data Field" corresponding to Bit 12 may be triggered. It is envisioned that the in some embodiments, the iOAM Node Data Field may include, by way of non-limiting example, information pertaining to a power efficiency data field and GHG Emissions. More specifically, in some embodiments the power efficiency data field may include a 32-bit unsigned int, e.g., an integer data type that can holds non-negative values that represents Watts/Gig on a 24-hour basis. Similarly, the GHG Node Data Field may include a 32-bit unsigned int, which denotes equivalent GHG emissions, given the energy over 24 hours and a location. It should be understood that additional formats and metadata may be included without limitation.

Although a specific embodiment is described above with respect to FIG. 2, any of a variety of systems and/or processes may be utilized in accordance with embodiments of the disclosure. For example, an iOAM header may be extended to insert and carry power efficiency and GHG details gathered during operations of a network over nearly any desired period of time, for example. The aspects described in FIG. 2 may also be interchangeable with other elements of FIGS. 1 and 3-10 as required to realize a particularly desired embodiment.

Figure 3:
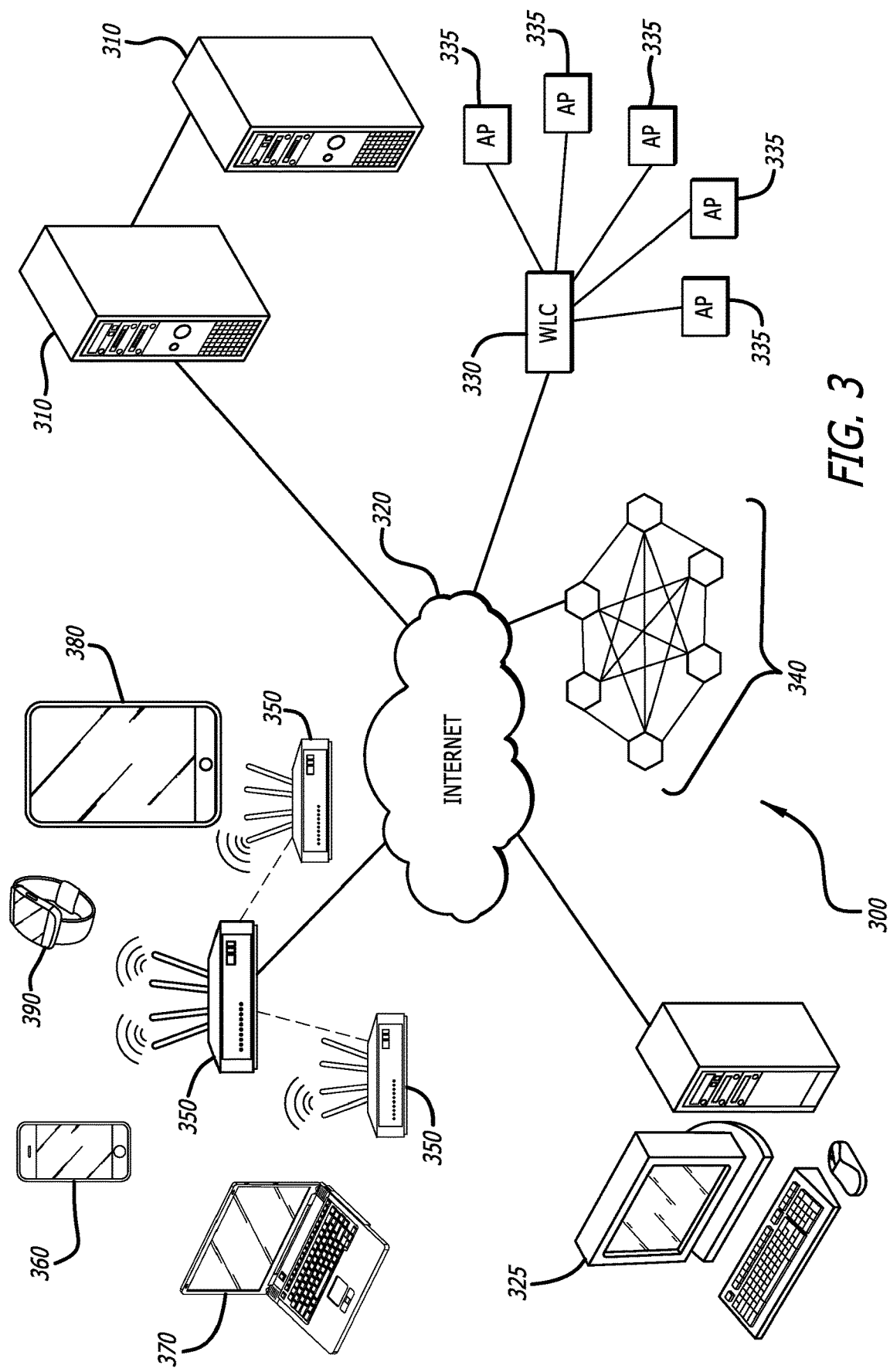
FIG. 3 is a conceptual network diagram of a various environments that a network capacity prediction logic may operate on a plurality of network devices in accordance with various embodiments of the disclosure in accordance with various embodiments of the disclosure.

Referring to FIG. 3, a conceptual network diagram of a various environments that a network capacity prediction logic may operate on a plurality of network devices in accordance with various embodiments of the disclosure is shown. Those skilled in the art will recognize that a network capacity prediction logic can be comprised of various hardware and/or software deployments and can be configured in a variety of ways. In some non-limiting examples, the network capacity prediction logic can be configured as a standalone device, exist as a logic within another network device, be distributed among various network devices operating in tandem, or remotely operated as part of a cloud-based network management tool.

In many embodiments, the network 300 may comprise a plurality of devices that are configured to transmit and receive data for a plurality of clients. In various embodiments, cloud-based network management servers 310 are connected to a wide-area network such as, for example, the Internet 320. In further embodiments, cloud-based network management servers 310 can be configured with or otherwise operate a network capacity prediction logic. The network capacity prediction logic can be provided as a cloud-based service that can service remote networks, such as, but not limited to the deployed network 340. In these embodiments, the network capacity prediction logic can be a logic that receives data from the deployed network 340 and generates predictions, confidence levels, and perhaps automates certain decisions associated with the network devices. In certain embodiments, the network capacity prediction logic can generate historical and/or algorithmic data in various embodiments and transmit that back to one or more network devices within the deployed network 340.

However, in additional embodiments, the network capacity prediction logic may be operated as distributed logic across multiple network devices. In the embodiment depicted in FIG. 3, a plurality of network access points (APs) 350 can operate as a network capacity prediction logic in a distributed manner or may have one specific device facilitate the generation of predictions and confidence levels for the various APs. This can be done to provide sufficient needs to the network of APs such that, for example, a minimum bandwidth capacity may be available to various devices. These devices may include but are not limited to mobile computing devices including laptop computers 370, cellular phones 360, portable tablet computers 380 and wearable computing devices 390.

In still further embodiments, the network capacity prediction logic may be integrated within another network device. In the embodiment depicted in FIG. 3, the wireless LAN controller (WLC) 330 may have an integrated network capacity prediction logic that it can use to generate predictions, confidence levels, and perhaps automated decisions regarding the various APs 335 that it is connected to, either wired or wirelessly. In this way, the APs 335 can be configured with a sustainable network configuration based on the configurations generated by and sent from the WLC 330. In still more embodiments, a personal computer 325 may be utilized to access and/or manage various aspects of the network capacity prediction logic, either remotely or within the network itself. In the embodiment depicted in FIG. 3, the personal computer 325 communicates over the Internet 320 and can access the network capacity prediction logic within the network management servers 310, the network APs 350, or the WLC 330 to modify or otherwise monitor the network capacity prediction logic.

Although a specific embodiment for a conceptual network diagram of a various environments that a network capacity prediction logic may operate on a plurality of network devices suitable for carrying out the various steps, processes, methods, and operations described herein is discussed with respect to FIG. 3, any of a variety of systems and/or processes may be utilized in accordance with embodiments of the disclosure. For example, the network capacity prediction logic may be implemented across a variety of the systems described herein such that some predictions are generated a first system type (e.g., remotely), while the confidence levels are generated in a second system type (e.g., locally). The elements depicted in FIG. 3 may also be interchangeable with other elements of FIGS. 2-9 as required to realize a particularly desired embodiment.

Although a specific embodiment for a conceptual network diagram of a various environments that a network capacity prediction logic may operate on a plurality of network devices suitable for carrying out the various steps, processes, methods, and operations described herein is discussed with respect to FIG. 3, any of a variety of systems and/or processes may be utilized in accordance with embodiments of the disclosure. For example, the network capacity prediction logic may be implemented across a variety of the systems described herein such that some predictions are generated a first system type (e.g., remotely), while the confidence levels are generated in a second system type (e.g., locally). The elements depicted in FIG. 3 may also be interchangeable with other elements of FIGS. 1-2 and 4-9 as required to realize a particularly desired embodiment.

Figure 4:
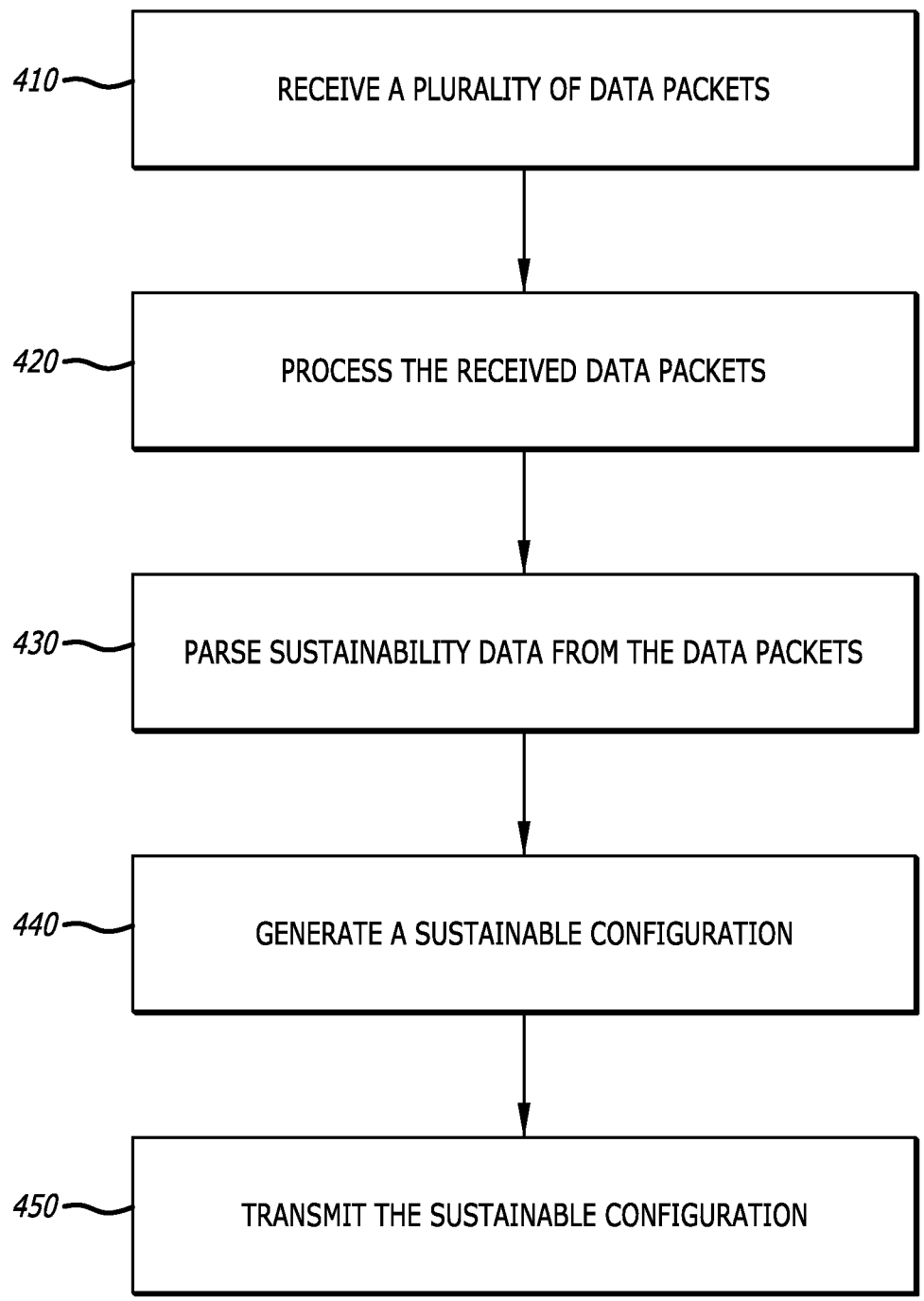
FIG. 4 is a flowchart depicting a general process for receiving and processing data packets with incorporated sustainability data in accordance with various embodiments of the disclosure.

Referring to FIG. 4, a flowchart depicting a general process for receiving and processing data packets with incorporated sustainability data in accordance with various embodiments of the disclosure is shown. For example, a plurality of data packets is received (block 410). In various embodiments, the data packets contain various information that is crucial for the overall process. Once the packets are received, they are processed to extract the necessary data and prepare it for further analysis (block 420). After the processing stage, the system moves on to parse sustainability data from the received data packets (block 430). In various embodiments, this involves identifying and extracting specific information related to sustainability metrics, such as energy consumption, waste generation, or carbon emissions. By parsing this data, insights may be gained with respect to the current sustainability performance of the system or device under consideration.

Based on the parsed sustainability data, the system generates a sustainable configuration (block 440). This step may involve analyzing the extracted information and formulating a configuration or set of parameters that will optimize sustainability. The sustainable configuration may include adjustments to resource usage, operational practices, or any other relevant aspect that can contribute to improved sustainability. Once the sustainable configuration is generated, the system transmits it (block 450). This involves sending the configuration to the appropriate devices, systems, or stakeholders that can implement the necessary changes. By transmitting the sustainable configuration, the system enables the recipients to adopt more sustainable practices or optimize their operations in accordance with various embodiments as described herein.

Although a specific embodiment for a process for receiving and processing data packets with incorporated sustainability data for carrying out the various steps, processes, methods, and operations described herein is discussed with respect to FIG. 4, any of a variety of systems and/or processes may be utilized in accordance with embodiments of the disclosure. For example, the process may be done by an AP, switch, router, or other network device. Furthermore, the process 400 is provided as an illustrated example to convey the concepts described herein and may not be implemented exactly as described. The elements depicted in FIG. 4 may also be interchangeable with other elements of FIGS. 1-3 and 5-10 as required to realize a particularly desired embodiment.

Figure 5:
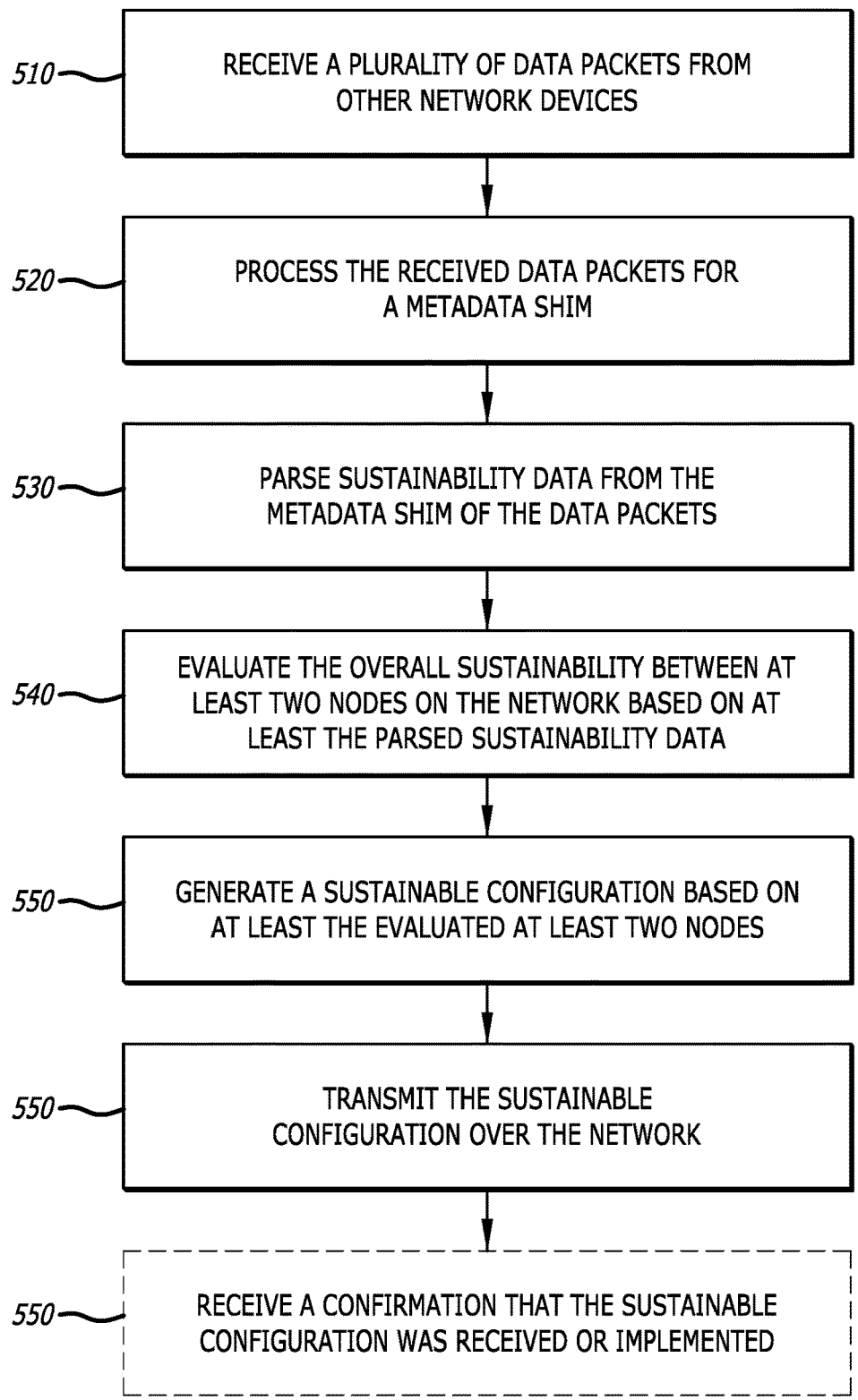
FIG. 5 is a flowchart depicting a more detailed process for receiving and processing data packets with incorporated sustainability data in accordance with various embodiments of the disclosure.

Referring to FIG. 5, a flowchart depicting a more detailed process for receiving and processing data packets with incorporated sustainability data in accordance with various embodiments of the disclosure is shown. For example, a plurality of data packets from other network devices are received (block 510). The data packets contain information that may be processed and analyzed for sustainability-related purposes. Once received, data packets are processed to identify and extract the metadata shim (block 520). In various embodiments, the metadata shim may include specific details and additional information that will be used for further analysis. After extracting the metadata shim, the process moves on to parse sustainability data from the metadata (block 530). In some embodiments, this may involve examining the metadata for relevant sustainability metrics such as energy consumption, carbon footprint, or resource utilization. By parsing this data, the system gains insights into the sustainability performance of the network nodes.

Once the sustainability data is parsed, the system proceeds to evaluate the overall sustainability between at least two nodes on the network (block 540). This evaluation process considers the parsed sustainability data and compares the sustainability metrics of the selected nodes. By way of non-liming example, areas where improvements can be made or to assess the overall sustainability performance of the network may be identified. Based on the evaluation results, the process may generate a sustainable configuration based on at least the evaluated at least two nodes (block 550). This configuration may incorporate the findings from the evaluation process and suggests one or more adjustments or optimizations to enhance sustainability. The sustainable configuration may include recommendations for energy-efficient settings, resource allocation strategies, or other measures that can contribute to improved sustainability.

Once the sustainable configuration is generated, the system transmits the configuration over the network (block 560). This may include sending the configuration to the respective network nodes or devices that need to implement the suggested changes. By transmitting the sustainable configuration, the system enables the nodes to adopt sustainable practices and align their operations with the recommended settings. Optionally, the process can receive a confirmation indicating that the sustainable configuration has been received or implemented (block 570). This confirmation serves as a feedback mechanism to ensure that the suggested changes have been successfully applied and that the network is operating in a more sustainable manner.

Although a specific embodiment for a process for receiving and processing data packets with incorporated sustainability data in accordance with various embodiments of the disclosure is shown for carrying out the various steps, processes, methods, and operations described herein is discussed with respect to FIG. 5, any of a variety of systems and/or processes may be utilized in accordance with embodiments of the disclosure. For example, the process may be done by an AP, switch, router, or other network device. The elements depicted in FIG. 5 may also be interchangeable with other elements of FIGS. 1-4 and 6-10 as required to realize a particularly desired embodiment.

Figure 6:
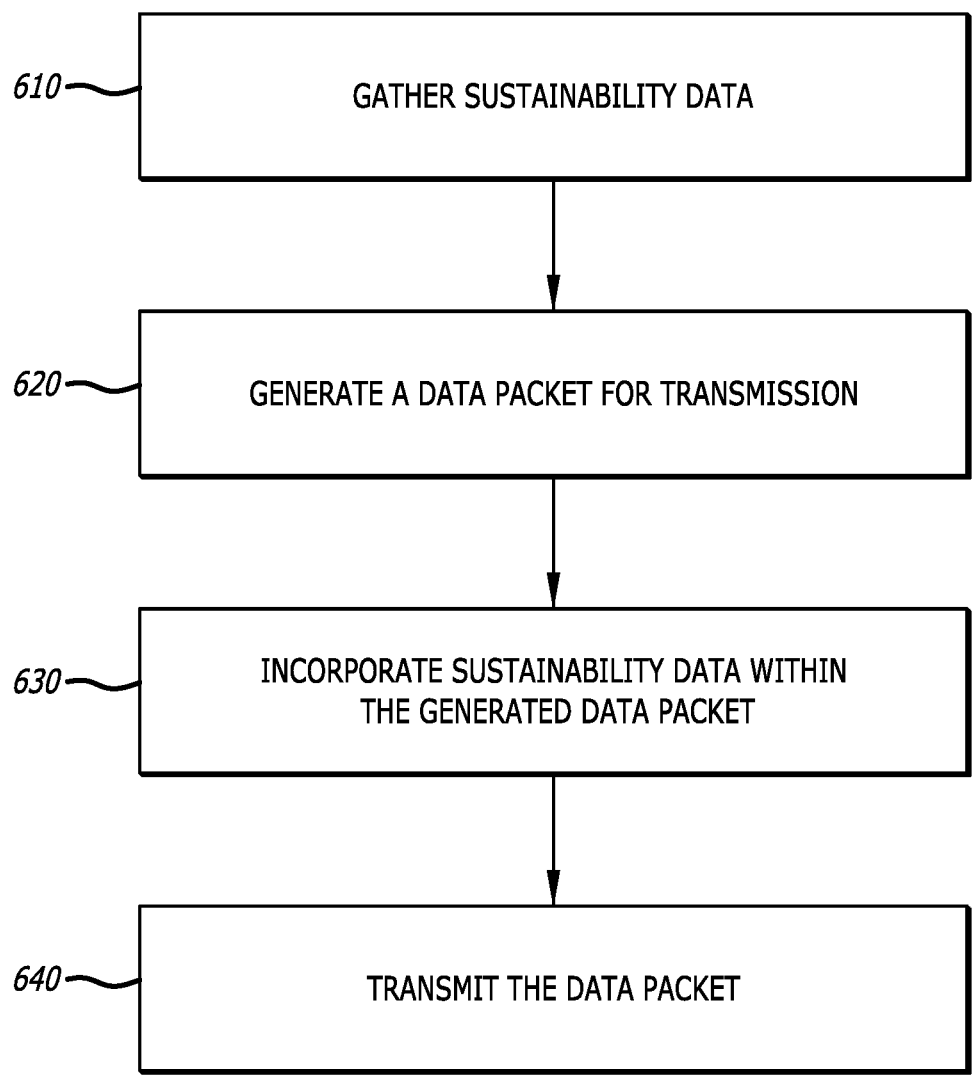
FIG. 6 is a flowchart depicting a general process for transmitting sustainability data packets in accordance with various embodiments of the disclosure.

Referring to FIG. 6, a flowchart depicting a general process for transmitting sustainability data packets in accordance with various embodiments of the disclosure is shown. In general, the process 600 may utilized various sources and methods to collect relevant information about a network's environmental impact, energy consumption, and other factors that contribute to sustainability. The process 600 begins by gathering sustainability data (block 610). Once the sustainability data has been collected and compiled, a data packet is generated for transmission (block 620). This involves organizing the gathered data into a structured format that can be easily transmitted and understood by the intended recipients. The data packet may include information regarding energy usage, greenhouse gas emissions, waste generation, and/or other sustainability-related metrics, without limitation.

To ensure that the sustainability data is properly incorporated within the generated data packet, it is carefully integrated into the appropriate sections and fields (block 630). This may involve tagging the data with relevant identifiers, categorizing it according to different sustainability dimensions, and formatting it in a standardized manner to ensure compatibility and interoperability with the receiving systems. Once the data packet has been prepared, the next step is to transmit the data packet (block 640). This involves transferring the data electronically from the source to the intended destination. The transmission can occur through various means, such as secure internet connections, dedicated data networks, or other communication channels. The data packet is sent to the designated recipients, which could include internal stakeholders, regulatory bodies, sustainability rating agencies, or other interested parties who require access to the organization's sustainability information.

Although a specific embodiment for a process for receiving and processing data packets with incorporated sustainability data in accordance with various embodiments of the disclosure is shown, the various steps, processes, methods, and operations described herein is discussed with respect to FIG. 6, any of a variety of systems and/or processes may be utilized in accordance with embodiments of the disclosure. The elements depicted in FIG. 6 may also be interchangeable with other elements of FIGS. 1-5 and 7-10 as required to realize a particularly desired embodiment.

Figure 7:
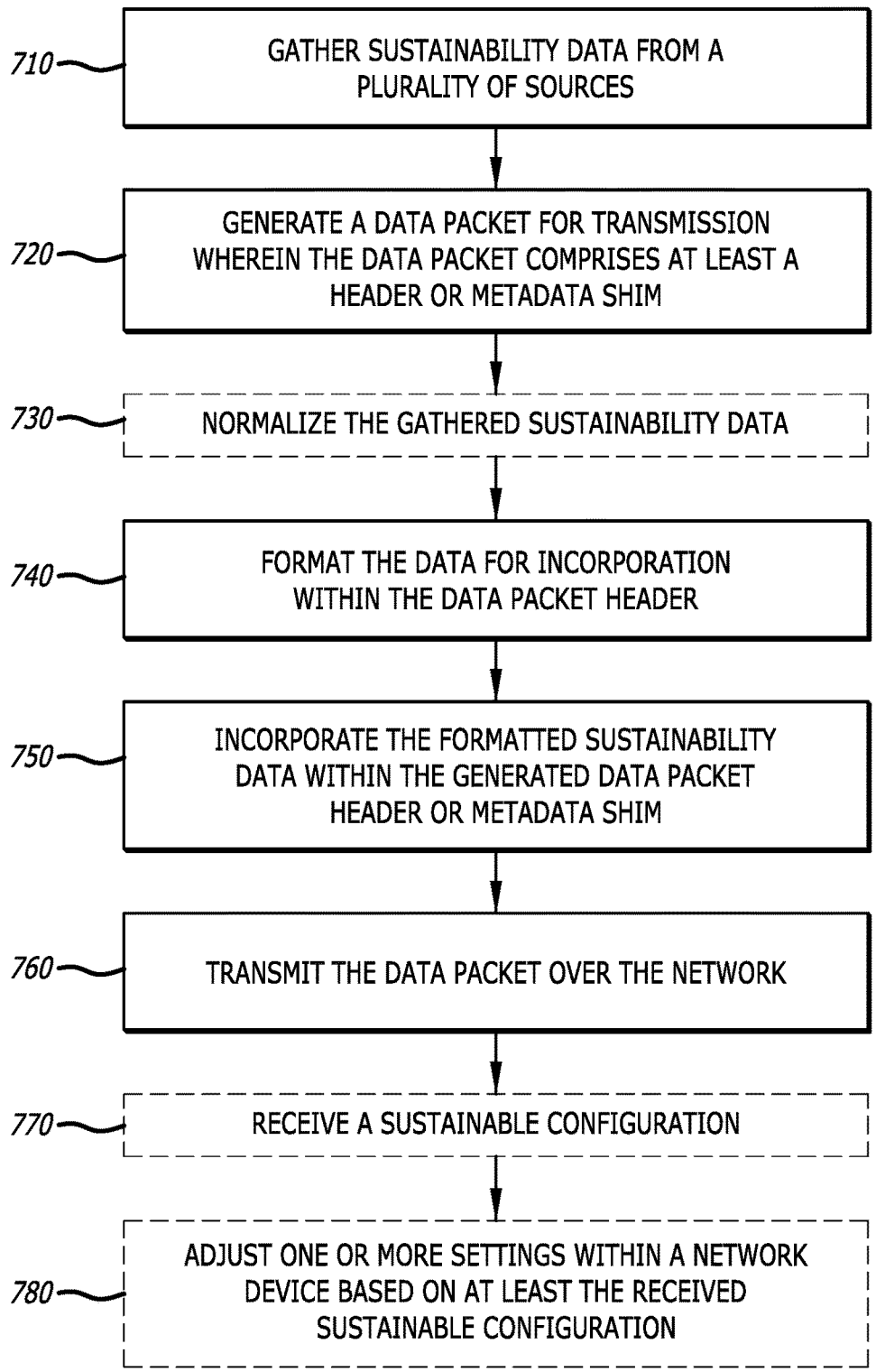
FIG. 7 is a flowchart depicting a more detailed process for transmitting sustainability data packets in accordance with various embodiments of the disclosure.

Referring to FIG. 7, a flowchart depicting a more detailed process for transmitting sustainability data packets in accordance with various embodiments of the disclosure is shown. In the process 700 of gathering sustainability data from a plurality of sources, organizations employ a diverse range of methods and techniques (block 710). These sources may include any of various routers, switches, APs, etc., without limitation. Once the sustainability data has been collected, a data packet is generated for transmission (block 720). In general, the data packet serves as a container for the collected information and is designed to facilitate its transfer to the intended recipients. At a minimum, the data packet includes a respective header or iOAM metadata shim that provides essential information about the content of the packet, such as the source, timestamp, and data format.

In some cases, the gathered sustainability data is normalized prior to incorporating it into the data packet (block 730). Normalization may involve standardizing the data across different sources, units of measurement, or data formats. This step ensures consistency and compatibility in the subsequent stages of data processing and analysis. After normalization, the next step is to format the sustainability data for incorporation within the data packet header (block 740). This may involve structuring the data in a way that aligns with the predefined format and protocol of the data packet. The formatting process may include assigning specific data fields, applying data encoding techniques, and ensuring adherence to relevant data standards. Once the formatting is complete, the formatted sustainability data is incorporated within the generated data packet header or metadata shim (block 750). This integration ensures that the essential sustainability information is readily accessible and identifiable when the packet is received by the intended recipients. By including the data in the header or metadata shim, the sustainability metrics and indicators can be quickly interpreted without the need to parse the entire packet. Subsequently, the data packet, now containing the sustainability data, may be transmitted over the network (block 760). This transmission process may involve sending the packet through appropriate communication channels, such as wired or wireless networks, internet connections, or dedicated data transfer systems. The packet may be directed to the designated recipients, ensuring secure and timely delivery of the sustainability information.

Optionally, during the transmission process, there may be a step to receive a sustainable configuration (block 770). This configuration may include details, metrics, and/or guidance regarding sustainability targets, thresholds, or operational guidelines that can further inform decision-making and performance improvement. If a sustainable configuration is received, there may be a subsequent step to adjust one or more settings within a network device based on the received configuration (block 780). This adjustment may allow an organization to align its network infrastructure, systems, or processes with the recommended sustainability practices. By optimizing network settings in response to the received configuration, organizations can enhance energy efficiency, reduce resource consumption, or adopt other sustainable measures.

Although a specific embodiment for transmitting sustainability data packets in accordance with various embodiments of the disclosure is shown for carrying out the various steps, processes, methods, and operations described herein with respect to FIG. 7, any of a variety of systems and/or processes may be utilized in accordance with embodiments of the disclosure. The elements depicted in FIG. 7 may also be interchangeable with other elements of FIGS. 1-6 and 8-10 as required to realize a particularly desired embodiment.

Figure 8:
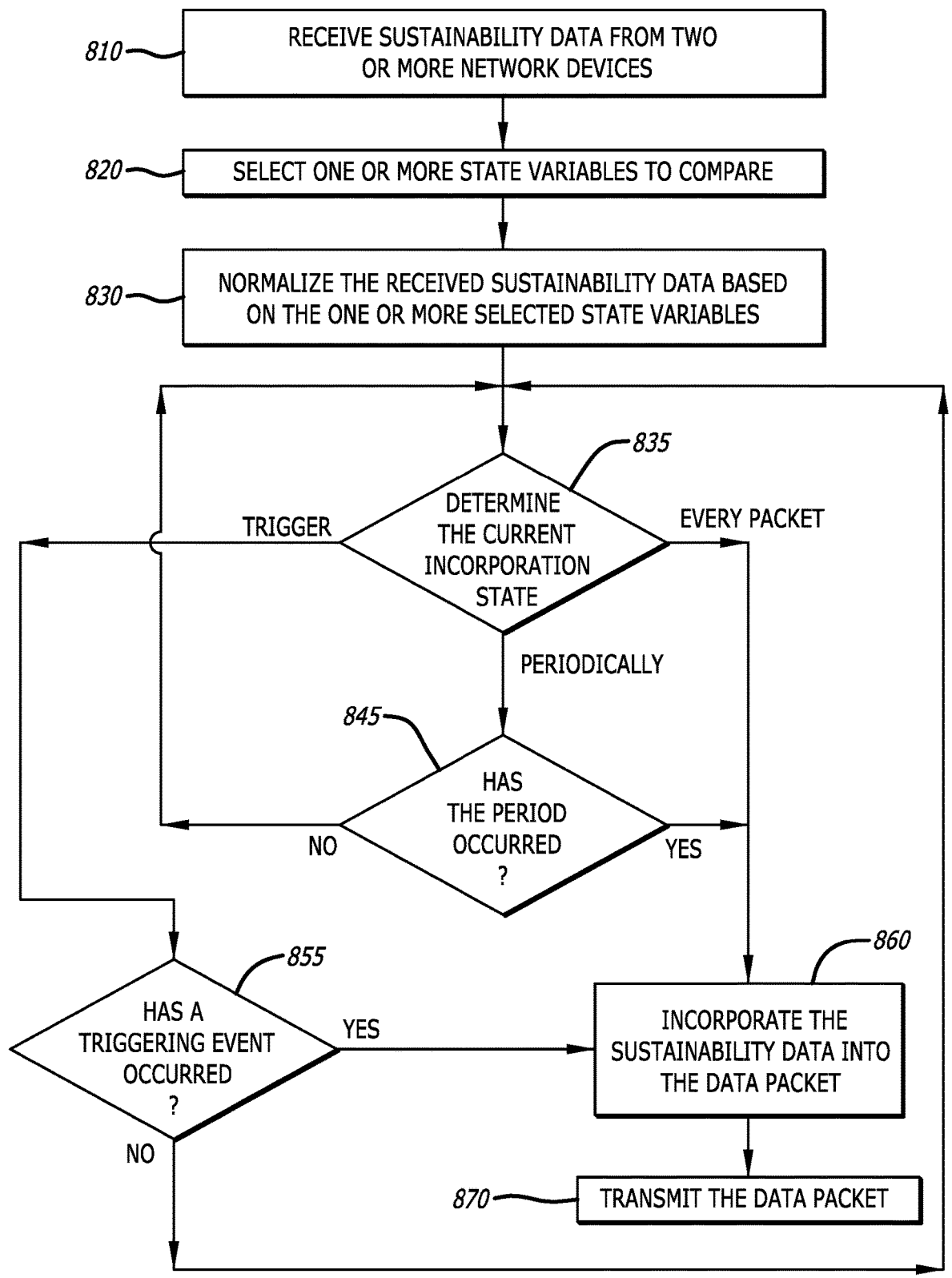
FIG. 8 is a flowchart depicting a process for incorporating sustainability data into data packets in accordance with various embodiments of the disclosure.

Referring to FIG. 8, a flowchart depicting a process for incorporating sustainability data into data packets in accordance with various embodiments of the disclosure is shown. For example, sustainability data is received from at least two network devices (block 810). These devices might include routers, switches, firewalls, or any other network equipment that provides relevant data regarding energy consumption, resource usage, or environmental impact.

One or more state variables are selected for comparison (block 820). State variables could represent different aspects of sustainability, such as power consumption, carbon emissions, or resource utilization. Various state variables may be generally defined at the node level. For example, power efficiency may correspond to power over overall throughout the network and may be expressed in kWatt/Gbps. Similarly, energy efficiency may correspond to energy used over a full day (24 hours) over the overall device throughout and may be expressed in kWatt*H/Gbps. A location may include one or more aspects of geo-location to determine a carbon intensity of the electricity used. In general, GHG may refer to an amount of CO2e generated to produce the electricity used in the device over a day, throughout device at a particular time. The selection of these variables may depend on the specific goals and priorities of the sustainability analysis.

The received sustainability data is normalized based on the selected state variables (block 830). Normalization may involve adjusting the data to a common scale or reference point to facilitate meaningful comparisons. This step ensures that the sustainability data from different devices, which may have different units or scales, can be properly evaluated and compared. Thereafter, a current incorporation state is determined (block 835). This step refers to assessing the current level of sustainability incorporation within the network infrastructure or packet or node. It could involve analyzing the normalized sustainability data, comparing it against predefined thresholds or benchmarks, and deriving insights regarding the network's sustainability performance. This information can help identify areas for improvement, make informed decisions, and track progress towards sustainable network operations. To that end, sustainability data may be incorporated into the data packet (block 860). If the incorporation is desired periodically, then a determination is made if the period has occurred (block 845). If yes, then the sustainability data is incorporated into the data pack (block 860). If no, then the process returns to block 835. Finally, if the incorporation state is a trigger, then the process continues to determine if a triggering event occurred (block 855). If yes, then the sustainability data is incorporated into the data pack (block 860). If no, then the process returns to block 835.

Although a specific embodiment for incorporating sustainability data into data packets suitable for carrying out the various steps, processes, methods, and operations described herein is discussed with respect to FIG. 8, any of a variety of systems and/or processes may be utilized in accordance with embodiments of the disclosure. For example, the state variables may be expanded or limited as desired. Similarly, the incorporation state may vary based on any desired timeframe or period. To that end, any event or conditional programming may be utilized or established as a triggering event or function. The elements depicted in FIG. 8 may also be interchangeable with other elements of FIGS. 1-7 and 9-10 as required to realize a particularly desired embodiment.

Figure 9:
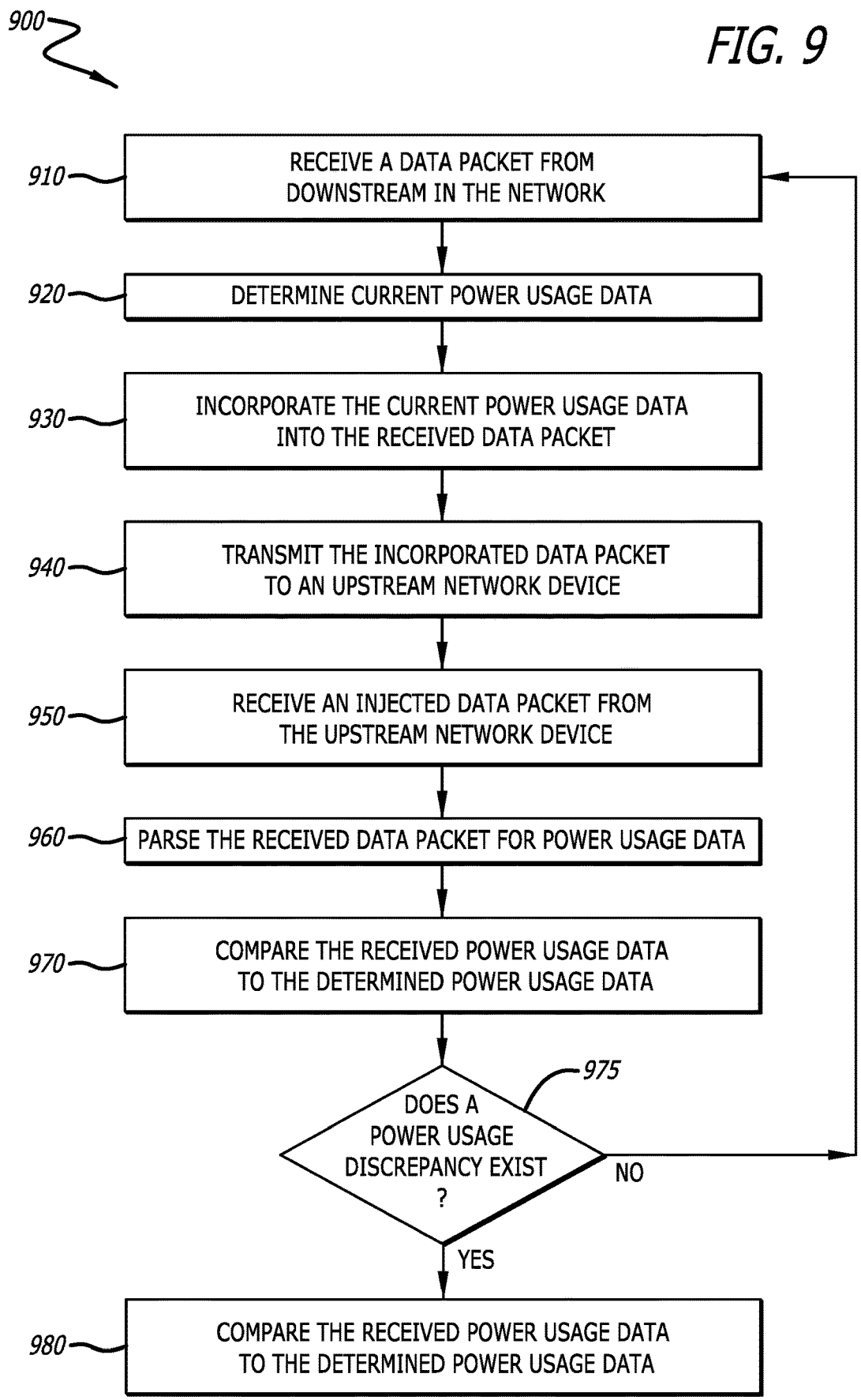
FIG. 9 is a flowchart depicting a process for utilizing sustainability data to verify the power output of network devices in accordance with various embodiments of the disclosure.

Referring to FIG. 9, a flowchart depicting a process for utilizing sustainability data to verify the power output of network devices in accordance with various embodiments of the disclosure is shown.

The process begins where a data packet is received from a downstream source (block 910). Current power usage data is determined, providing valuable information about the system's energy consumption (block 920). The current power usage data is then incorporated into the received data packet, ensuring that the power-related information is included for further analysis and transmission (block 930). Thereafter, newly updated data packet to an upstream network device (block 940). This allows for the exchange of data and facilitates the flow of information within the network infrastructure.

Once the data packet reaches the upstream device, an injected data packet is received (block 950). Thereafter, the received data packet is parsed, and the power usage data is extracted for analysis (block 960). This information may be useful in monitoring and assessing the power consumption within the network. A comparison is made between the received power usage data and the previously determined power usage data, enabling the identification of any potential discrepancies or variations in energy usage (block 970).

A determination is then made to query whether power usage discrepancy exists (block 975). This query prompts further investigation into the data to determine if there are any discrepancies that need to be addressed. This comprehensive process ensures that power usage within the network is closely monitored, enabling efficient energy management and the identification of any anomalies or irregularities in power consumption. If the response to the query is yes, then a notification may be generated that a power usage discrepancy exists (block 980). If the response to the query is no, then the process returns to block 910.

Although a specific embodiment for utilizing sustainability data to verify the power output of network devices for carrying out the various steps, processes, methods, and operations described herein is discussed with respect to FIG. 9, any of a variety of systems and/or processes may be utilized in accordance with embodiments of the disclosure. For example, the current power usage data may be contextualized over a predetermined time frame or location, or with respect to a particular user. Similarly, the received data packet may be parsed using any of various methods. The elements depicted in FIG. 9 may also be interchangeable with other elements of FIGS. 1-8 and 10 as required to realize a particularly desired embodiment.

Figure 10:
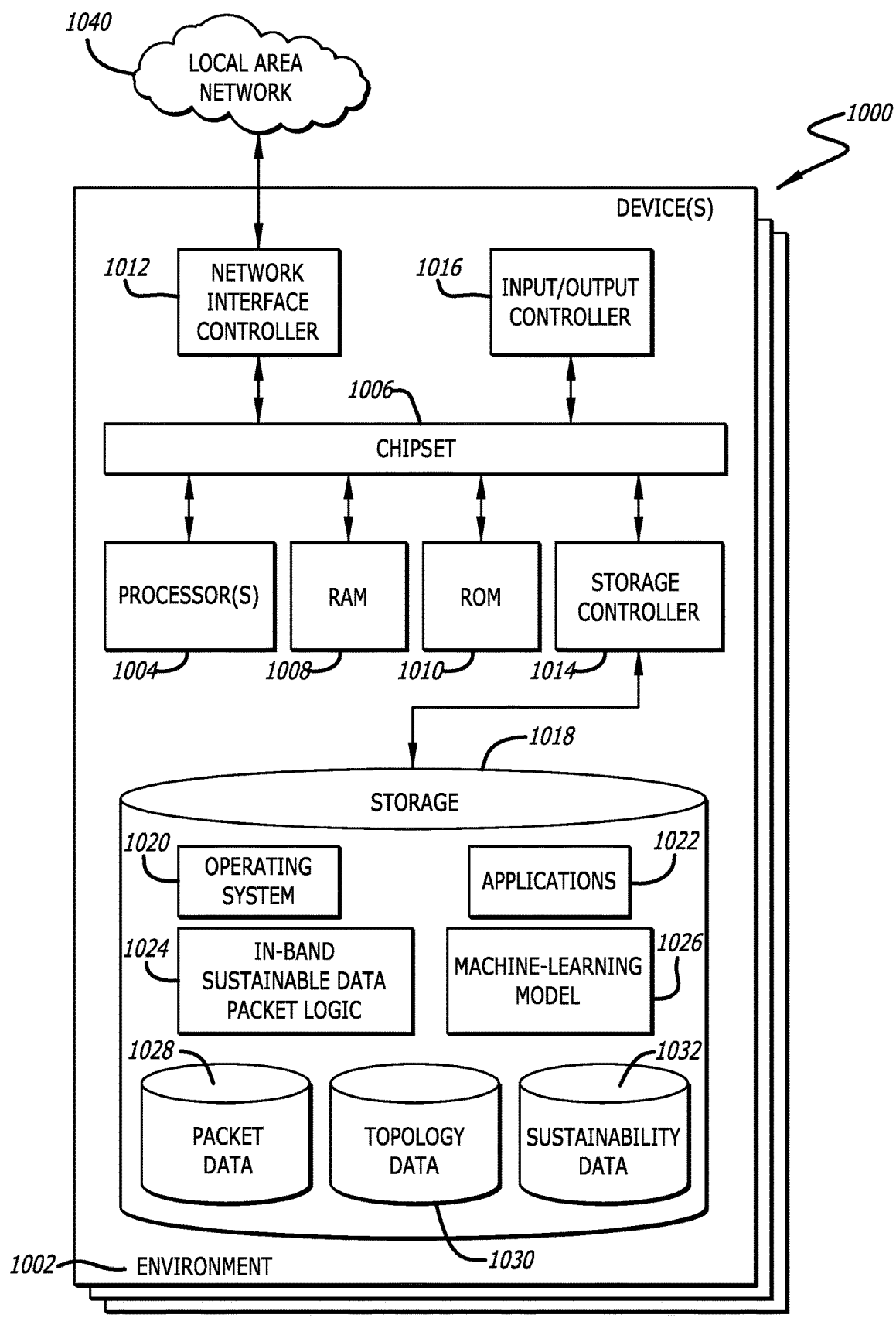
FIG. 10 is a conceptual block diagram of a device suitable for processing data packets with incorporated sustainability data in accordance with various embodiments of the disclosure.

Referring to FIG. 10, a conceptual block diagram of a device suitable for processing data packets with incorporated sustainability data in accordance with various embodiments of the disclosure is shown.

The embodiment of the conceptual block diagram depicted in FIG. 10 can illustrate a conventional server computer, workstation, desktop computer, laptop, tablet, network device, router, switch, e-reader, smart phone, or other computing device, and can be utilized to execute any of the application and/or logic components presented herein. The device 1000 may, in some examples, correspond to physical devices and/or to virtual resources and embodiments described herein.

In many embodiments, the device 1000 may include an environment 1002 such as a baseboard or "motherboard," in physical embodiments that can be configured as a printed circuit board with a multitude of components or devices connected by way of a system bus or other electrical communication paths. Conceptually, in virtualized embodiments, the environment 1002 may be a virtual environment that encompasses and executes the remaining components and resources of the device 1000. In more embodiments, one or more processors 1004, such as, but not limited to, central processing units ("CPUs") can be configured to operate in conjunction with a chipset 1006. The processor(s) 1004 can be standard programmable CPUs that perform arithmetic and logical operations necessary for the operation of the device 1000.

In additional embodiments, the processor(s) 1004 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1006 may provide an interface between the processor(s) 1004 and the remainder of the components and devices within the environment 1002. The chipset 1006 can provide an interface to communicatively couple a random-access memory ("RAM") 1008, which can be used as the main memory in the device 1000 in some embodiments. The chipset 1006 can further be configured to provide an interface to a computer-readable storage medium such as a read-only memory ("ROM") 1010 or non-volatile RAM ("NVRAM") for storing basic routines that can help with various tasks such as, but not limited to, starting up the device 1000 and/or transferring information between the various components and devices. The ROM 1010 or NVRAM can also store other application components necessary for the operation of the device 1000 in accordance with various embodiments described herein.

Different embodiments of the device 1000 can be configured to operate in a networked environment using logical connections to remote computing devices and computer systems through a network, such as the network 1040. The chipset 1006 can include functionality for providing network connectivity through a network interface card ("NIC") 1012, which may comprise a gigabit Ethernet adapter or similar component. The NIC 1012 can be capable of connecting the device 1000 to other devices over the network 1040. It is contemplated that multiple NICs 1012 may be present in the device 1000, connecting the device to other types of networks and remote systems.

In further embodiments, the device 1000 can be connected to a storage 1018 that provides non-volatile storage for data accessible by the device 1000. The storage 1018 can, for example, store an operating system 1020, applications 1022, and packet data 1028, topology data 1030, sustainability data 1032, which are described in greater detail below. The storage 1018 can be connected to the environment 1002 through a storage controller 1014 connected to the chipset 1006. In certain embodiments, the storage 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1000 can store data within the storage 1018 by transforming the physical state of the physical storage units to reflect the information being stored. The specific transformation of physical state can depend on various factors. Examples of such factors can include, but are not limited to, the technology used to implement the physical storage units, whether the storage 1018 is characterized as primary or secondary storage, and the like.

For example, the device 1000 can store information within the storage 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1000 can further read or access information from the storage 1018 by detecting the physical states or characteristics of one or more particular locations within the physical storage units.

In addition to the storage 1018 described above, the device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1000. In some examples, the operations performed by a cloud computing network, and or any components included therein, may be supported by one or more devices similar to device 1000. Stated otherwise, some or all of the operations performed by the cloud computing network, and or any components included therein, may be performed by one or more devices 1000 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1018 can store an operating system 1020 utilized to control the operation of the device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1018 can store other system or application programs and data utilized by the device 1000.

In various embodiment, the storage 1018 or other computer-readable storage media is encoded with computer-executable instructions which, when loaded into the device 1000, may transform it from a general-purpose computing system into a special-purpose computer capable of implementing the embodiments described herein. These computer-executable instructions may be stored as application 1022 and transform the device 1000 by specifying how the processor(s) 1004 can transition between states, as described above. In some embodiments, the device 1000 has access to computer-readable storage media storing computer-executable instructions which, when executed by the device 1000, perform the various processes described above with regard to FIGS. 1-9. In more embodiments, the device 1000 can also include computer-readable storage media having instructions stored thereupon for performing any of the other computer-implemented operations described herein.

In still further embodiments, the device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can be configured to provide output to a display, such as a computer monitor, a flat panel display, a digital projector, a printer, or other type of output device. Those skilled in the art will recognize that the device 1000 might not include all of the components shown in FIG. 10 and can include other components that are not explicitly shown in FIG. 10 or might utilize an architecture completely different than that shown in FIG. 10.

As described above, the device 1000 may support a virtualization layer, such as one or more virtual resources executing on the device 1000. In some examples, the virtualization layer may be supported by a hypervisor that provides one or more virtual machines running on the device 1000 to perform functions described herein. The virtualization layer may generally support a virtual resource that performs at least a portion of the techniques described herein.

In many embodiments, the device 1000 can include a in-band sustainable data packet logic 1024 that can be configured to perform one or more of the various steps, processes, operations, and/or other methods that are described above. While the embodiment shown in FIG. 10 depicts a logic focused on network capacity, it is contemplated that a more general "network needs" logic may be utilized as well or in lieu of such logic. Often, the in-band sustainable data packet logic 1024 can be a set of instructions stored within a non-volatile memory that, when executed by the controller(s)/processor(s) 1004 can carry out these steps, etc. In some embodiments, the in-band sustainable data packet logic 1024 may be a client application that resides on a network-connected device, such as, but not limited to, a server, switch, personal or mobile computing device in a single or distributed arrangement. In certain embodiments, the in-band sustainable data packet logic 1024 can be a dedicated hardware device or be configured into a system on a chip package (FPGA, ASIC and the like).

In a number of embodiments, the storage 1018 can include packet data 1028. As discussed above, the sustainability data 1032 can be collected in a variety of ways and may involve data related to multiple levels of the topology. The sustainability data 1032 may be associated with an entire network or a portion/partition of a network. This may also include a relationship of the various associated APs that are associated with each other AP or network device such that relationships of how to transfer or "pre-move" clients back and forth can be determined based on the sustainability data 1032 as currently understood. In additional embodiments, the sustainability data 1032 can include not only the network devices and network traffic data associated within but may also include details about the hardware configuration and/or capabilities of the network devices within the floorplan. This can allow for more specific configurations based on various lower-power mode settings, or transceiver capabilities.

In various embodiments, the storage 1018 can include topology data 1030. As described above, topology data 1030 can be configured to include various items such as past need levels, client connection histories, as well as previously determined paths for those client connections. In some embodiments, each non-stationary client may be determined to follow one or more of a limited number of determined paths within the floorplan, which can indicate seasonality but also provide insight into predictions on where the client may need to be handed off to another AP or even pre-moved. For example, a mobile computing device like a smart phone can be held by a person walking through a typical path on a floorplan to go from one area to another. The limited number of paths within an office floorplan may indicate where that client may be moving toward. In some embodiments, external data, such as calendaring data can be accessed or stored in historical data to inform of patterns or paths that the client may take. In additional embodiments, topology data 1030 can be related to clients such that future predictions, such as with the ML, models 1026 can be utilized to better handle pre-moving clients when a known path is determined.

In still more embodiments, the storage 1018 can include sustainability data 1032. As discussed above, a floorplan being managed by a hardware-based network device may have a fixed amount of computational resources available and/or only have access to a limited number of methods to generate predictions and confidence levels. However, a cloud-based network suite may have access to a large number of computations resources and methods to generate predictions and confidence levels. Sustainability data 1032 can be configured to capture these available resources and options. In still further embodiments, the sustainability data 1032 can be configured to capture what the latency needs, and selected options are for each network device within the floorplan.

Finally, in many embodiments, data may be processed into a format usable by a machine-learning model 1026 (e.g., feature vectors), and or other pre-processing techniques. The machine-learning ("ML") model 1026 may be any type of ML model, such as supervised models, reinforcement models, and/or unsupervised models. The ML model 1026 may include one or more of linear regression models, logistic regression models, decision trees, Naïve Bayes models, neural networks, k-means cluster models, random forest models, and/or other types of ML models 1026. The ML model 1026 may be configured to learn the pattern of the client traffic flow of various network devices and generate predictions and/or confidence levels regarding future network needs. In some embodiments, the ML model 1026 can be configured to determine which method of generating those predictions would work best based on certain conditions or with certain network devices.

The ML model(s) 1026 can be configured to generate inferences to make predictions or draw conclusions from data. An inference can be considered the output of a process of applying a model to new data. This can occur by learning from at least the topology data, historical data, and/or the algorithmic data and use that learning to predict future outcomes and needs. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 1026 may be generated by human/administrator verifications or may compare predicted outcomes with actual outcomes.

Although a specific embodiment for a device suitable for processing data packets with incorporated sustainability data in accordance with various embodiments of the disclosure is shown for carrying out the various steps, processes, methods, and operations described herein is discussed with respect to FIG. 10, any of a variety of systems and/or processes may be utilized in accordance with embodiments of the disclosure. For example, the device may be in a virtual environment such as a cloud-based network administration suite, or it may be distributed across a variety of network devices or APs such that each acts as a device and the in-band sustainable data packet logic 1024 acts in tandem between the devices. The elements depicted in FIG. 10 may also be interchangeable with other elements of FIGS. 1-9 as required to realize a particularly desired embodiment.

Information Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each, and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A method of sustainably managing network devices, comprising:
   receiving a plurality of data packets from one or more network devices, wherein the plurality of data packets is formatted with sustainability data within a metadata shim;
   processing the received data packets;
   determining a current incorporation state;
   verifying if a triggering event has occurred;
   in response to determining that a desired period has occurred, incorporating the sustainability data into one or more of the data packets;
   generating a sustainable configuration for the one or more network devices, wherein the sustainable configuration comprises at least energy-efficient settings for the one or more network devices; and
   transmitting the generated sustainable configuration to the one or more network devices.

2. The method of claim 1, wherein the sustainability data comprises node- level sustainability data.

3. The method of claim 1, wherein the method is further configured to generate a heatmap of the one or more network devices based on the sustainability data.

4. The method of claim 1, wherein the sustainable configuration is configured to better optimize a next hop in the network.

5. The method of claim 1, wherein the method is executed via a non- centralized series of network devices.

6. The method of claim 1, wherein the sustainability data is configured to provide verification of power usage within one or more downstream network devices.

7. A network device, comprising:
   a processor;
   at least one network interface controller configured to provide access to a network; and
   a memory communicatively coupled to the processor, wherein the memory comprises an in-band sustainable data packet logic that is configured to:
   gather sustainability data;

generate a data packet for transmission to another network device on the network, wherein the data packet comprises a header;
determining a current incorporation state;
verifying if a triggering event has occurred;
in response to determining that a desired period has occurred, incorporating the sustainability data within the header;
transmit the data packet to at least another network device on the network;
receive a sustainable configuration; and
adjust one or more energy-efficient settings based on the sustainable configuration.

8. The network device of claim 7, wherein the incorporation is within a metadata shim.

9. The network device of claim 8, wherein the incorporation occurs on every generated data packet.

10. The network device of claim 8, wherein the incorporation occurs periodically.

11. The network device of claim 8, wherein the incorporation occurs in response to one or more triggering events.

12. The network device of claim 7, wherein the sustainability data is associated with one or more nodes.

13. The network device of claim 12, wherein the sustainability data is only associated with network nodes.

14. The network device of claim 7, wherein the sustainability data is normalized.

15. The network device of claim 7, wherein the data packet is formatted as an in-situ operations, administration, and maintenance (iOAM) data packet.

16. A network device, comprising:
a processor;
at least one network interface controller configured to provide access to a network; and
a memory communicatively coupled to the processor, wherein the memory comprises an in-band sustainable data packet logic that is configured to:
receive a plurality of data packets from another network device on the network wherein the plurality of data packets is each formatted with sustainability data within a metadata shim;
process the received plurality of packets;
parse the sustainability data from within the metadata shims of a plurality of data packet headers;
determine a current incorporation state, and in response to determining that a desired period has occurred, incorporate the sustainability data into one or more of the plurality of packets;
generate a sustainable configuration for one or more network devices based on at least the parsed sustainability data, wherein the sustainable configuration comprises at least energy-efficient settings for the one or more network devices; and
transmit the generated sustainable configuration to the one or more network devices.

17. The network device of claim 16, wherein the sustainable configuration comprises one or more node settings.

18. The network device of claim 17, wherein the one or more node settings include entering a lower-power mode.

19. The network device of claim 17, wherein the one or more node settings include enabling a power-saving feature.

20. The network device of claim 17, wherein the one or more node settings include disabling a power-hungry feature.

* * * * *